March 26, 1963   E. W. SULLIVAN   3,083,098
METHOD AND MEANS FOR AGING ALCOHOLIC BEVERAGES
Filed Aug. 1, 1960

*INVENTOR.*
Edward W. Sullivan
BY
John H. Widdowson
*ATTORNEY*

United States Patent Office 3,083,098
Patented Mar. 26, 1963

3,083,098
METHOD AND MEANS FOR AGING ALCOHOLIC BEVERAGES
Edward W. Sullivan, 157 S. Washington, Wichita, Kans.
Filed Aug. 1, 1960, Ser. No. 46,560
7 Claims. (Cl. 99—48)

This invention is related to a method for aging alcoholic beverages and to structural means for practicing the method. More particularly, the invention relates to a method and means for aging alcoholic beverages which eliminates considerable man power involved during the aging process by eliminating steps previously required.

In making whiskey, brandy and the like it has long been the practice in the art to store the beverage for extended periods of time in charred barrels. In the aging process evaporation occurs, and, if the barrels are not turned frequently and regularly, the barrel will open at the seams, causing leaking and creating increased evaporation conditions. Further, agitation is missing or poor, resulting in poor contact between the body of whiskey and the barrel char.

In accordance with the present invention a new method and means for aging alcoholic beverages has been provided which overcomes deficiencies in the prior art aging processes. More specifically, the method and means of the invention eliminates the necessity for turning the barrels during the aging process, thereby considerably reducing the man power required during this extended period of aging. Also, the method and means of the invention is such that although the barrels are not turned during aging, the beverage stored therein is periodically placed in contact with the entire inner surface of the barrel, thereby preventing cracking and the resulting evaporation and loss of beverage stored therein.

The means for carrying out the invention includes a bladder positioned within the aging barrel. Means are provided to supply air or other fluids under pressure to the bladder to periodically expand same and place the beverage in the barrel in contact with the entire inner surface thereof, thereby preventing opening of the barrel and the seams. The method of the invention includes utilizing the means hereinbefore broadly described by supplying air under pressure to a bladder within an alcoholic beverage container to agitate same and to place the beverage in contact with the entire inner surface of the retaining barrel. Means are provided in the barrel so that exhaust gasses received therein can be exhausted therefrom during the aging process.

It is an object of the invention to provide a new method and means for aging alcoholic beverages.

Another object of the invention is to provide a method and means for aging alcoholic beverages in barrels which eliminates the necessity of turning the barrels periodically.

Another object of the invention is to provide a means to agitate an aging beverage within a barrel so as to place same in contact with the entire inner surface of the barrel to prevent cracking thereof with resultant leaking.

Various other objects, advantages and features of the invention will become apparent from the following description taken in connection with the accompanying drawings, in which.

Figure 1:
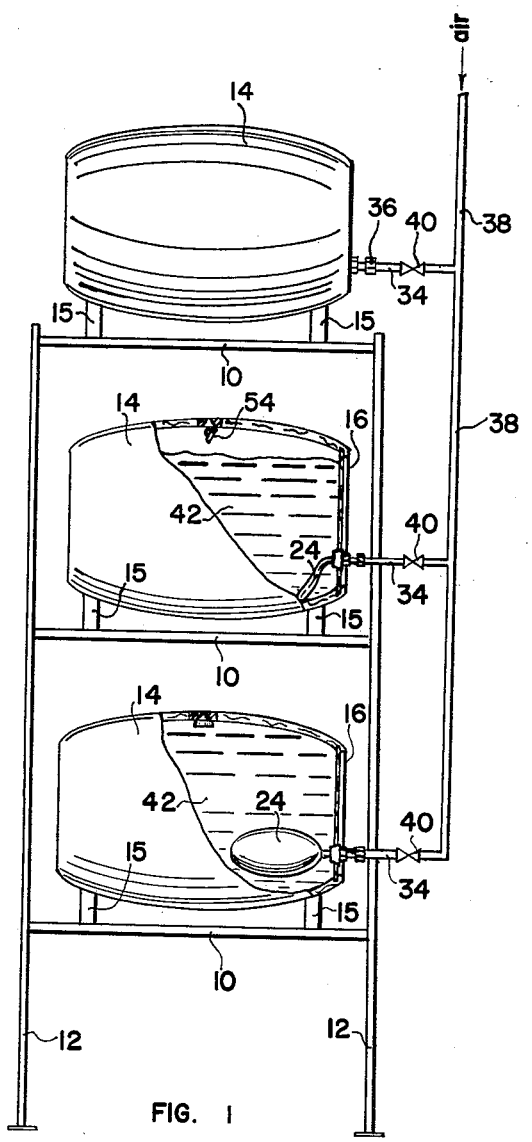
FIG. 1 is a side elevation view, partly in cross section, showing a preferred specific embodiment of the aging means of the invention.

The following is a discussion and description of a preferred specific method and means for aging alcoholic beverages, such being made with reference to the drawings whereon the same reference numerals are used to indicate the same or similar parts and/or structure. It is to be understood that such discussion and description is not to unduly limit the scope of the invention.

Referring now to the drawings in detail, FIG. 1 shows a plurality of vertically spaced platforms 10 supported on suitable frame members 12. The platforms 10 in each instance can extend horizontally to support a plurality of barrels on each level. Also, while three such levels are shown, this is for illustration only and can be varied as desired.

The various levels of platforms 10 have barrels 14 thereon of the type commonly used to age alcoholic beverages. Barrels 14 can be maintained on platforms 10 by supports 15. The barrels 14 are ordinarily wooden barrels which have been charred. By aging the beverage in such barrels the undesirable elements in the whiskey will be preferentially adsorbed by the charcoal wood char in the barrels, giving the finished product the desired purity, color, taste and aroma.

The barrels 14 are sometimes maintained in an aging warehouse where temperature and humidity are desirably controlled the year around. However, even ideally, during the period of aging, which ordinarily lasts several years, gases are given off by the aging beverage which collect in the top of the barrel providing for drying of the barrel. As the barrel dries it will open between the barrel staves and will begin to leak. To prevent this, so-called "leak hunters" must be employed to constantly check the barrels and periodically turn them to insure that the wooden barrels do not split or open between barrel staves. The present invention eliminates the necessity of periodically turning the barrels.

The barrel head or end of the barrel 16 has an opening or bung hole 18 in one end thereof into which a bung 20 is received and removably mounted. The bung 20 has a central passageway 22 formed therein which passes entirely through the bung.

An inflatable bladder 24 is provided and can be formed of polyethylene or other suitable resilient materials which are non-reactive with the beverage being aged. The bladder 24 is positioned within the barrel 14 with the open end of the bladder in engagement with the bung 20 so that the opening 22 in the bung 20 communicates with the opening in the bladder 24.

Figure 3:
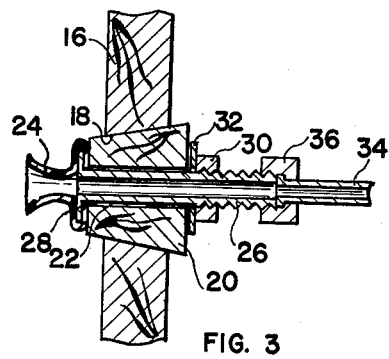
FIG. 3 is an enlarged partial cross section view of the bung inserted in one end of the barrel showing the means for attaching and retaining the air conduit and bladder in position.

In order to maintain the bladder 24 in proper position against the bung 20, a suitable coupling member 26 is provided which is dimensioned so as to be insertable through the opening 22 in the bung 20. The coupling member 26 has an annular flange 28 formed on the inner end thereof and which is larger than opening 22 through the bung 20. The open end of the bladder 24 is stretched onto the flange 28 as best seen in FIG. 3.

In order to maintain the coupling member 26 and the bladder 24 in position against the bung 20, the outer end of the coupling member 26 is threaded and receives a nut 30 and washer 32 so that when the nut 30 is tightened the flange 28 on the coupling member 26 will be urged into tight and sealing engagement with the bung 20.

A conduit 34 is provided and is removably and sealingly secured to the outer end of the coupling member 26 by any suitable means, such as the mounting member 36. The conduit 34 is in fluid communication with the bladder 24 through the coupling member 26. The conduit 34 is connected to an additional conduit or header pipe 38 through suitable valve means 40. The pipe 38 is connected to suitable means (not shown) for supplying air or other fluids under pressure to the bladder 24 through the conduit 34 and coupling member 26 when valve means 40 are opened.

It will be seen from the foregoing description when alcoholic beverage 42 is received within the barrels 14 it will be sealed therein in the usual manner by the bung 20. During the aging process a certain amount of the beverage 42 will evaporate, causing voids in the upper portion of the barrel as shown in the center barrel of FIG. 1. When this occurs, it is ordinarily necessary to periodically turn the barrels to keep them from opening between the individual staves. By utilizing the means of the invention air under pressure can be supplied to pipe 38 and through valve 40, conduit 34, and coupling member 26 into bladder 24, causing it to expand from the position shown in the middle barrel of FIG. 1 to the inflated position shown in the lower barrel of FIG. 1. As this occurs the beverage 42 will be displaced to be in contact with substantially the entire inner surface of the barrel 14, thereby preventing the barrel staves from drying and causing openings through which the beverage 42 will leak. As the bladder 24 is inflated and the beverage 42 is displaced as hereinbefore described, agitation of the beverage is provided which has a very desirable result on the aging process in that good contact for adsorption is made between the whiskey and charcoal.

Figure 2:
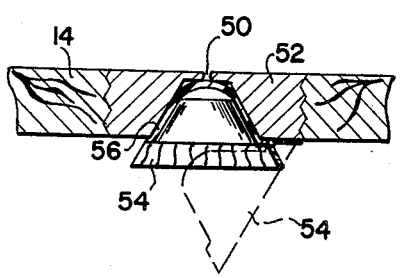
FIG. 2 is an enlarged partial cross section view of the exhaust hole and plug in the top portion of the aging barrel.

Means are preferably provided to exhaust gases from within the barrel 14. This is desirable since it permits the beverage 42 to fill the entire barrel as hereinbefore described. Preferably, the means for exhausting the gases function so as to be automatically closed when air is supplied to the bladder 24. A suitable means for accomplishing this is shown in FIG. 2 of the drawings.

An exhaust hole 50 is provided in a plug 52 or the like which can be secured in one of the staves of the barrel 14. The opening 50 can be of various shapes, however the shape generally shown in FIG. 2 is desirable. A plug or check valve 54 is pivotally or hingedly mounted on the inside of the plug 52 adjacent to the exhaust hole 50. The check valve 54 is preferably generally in the shape of the opening or exhaust hole 50 so as to be received therein in mating engagement. The check valve 54 can be covered with a relatively soft plastic material as shown at 56 so that when the check valve 54 is received in the exhaust hole 50 it will be in sealing engagement with the sides thereof to prevent the egress of the alcoholic beverage therefrom. Check valve 54 preferably has a base portion of wood, cork or other material which will float so that when engaged by the beverage 42 it will be urged into the exhaust hole 50 to close same.

In operation, as the beverage 43 begins to evaporate the exhaust gases will accumulate in the upper portion of the barrel immediately adjacent to and below the exhaust hole 50. As the evaporation continues and sufficient space occurs at the upper portion of the barrel, the check valve 54 will move to the open or down position as shown in FIG. 2, thus permitting the egress of the gases from the barrel 14 through the exhaust hole 50. When air is supplied through header pipe 38 to bladder 24 as hereinbefore described, and the beverage 42 is displaced so as to fill the barrel 14, the plug or check valve 54 will be urged upwardly, closing the exhaust hole 50 when the beverage 42 reaches the top portion of the barrel. While the means for exhausting the evaporative gases from the barrel 14 shown and described is preferred, other suitable means can be used, if desired.

The method of the invention includes the steps of filling a barrel with a beverage to be aged, placing an inflatable bladder within the barrel, and supplying air or other fluids preferably periodically, under pressure to the bladder to agitate the beverage and displace the beverage so it will be in contact with the entire inner surface of the barrel, while simultaneously exhausting the evaporative gases formed in the barrel to permit complete displacement of the beverage. The method steps can be carried out with a plurality of beverage aging barrels having conduit means connecting the air supply and inflatable bladders in each barrel.

The method and means of this invention can be utilized for aging various types of beverages, such as whiskey, brandy, wine, etc. The cycle in which the air is supplied to the inflatable bladder can be varied as desired in order to obtain the proper amount of agitation of the beverage within the barrel and to prevent the drying of the barrel.

While the invention has been described in connection with a preferred specific method and means for carrying out the invention, it will be understood that this description is intended to illustrate and not to limit the scope of the invention, which is defined by the claims.

I claim:

1. Means for aging alcoholic beverages comprising, in combination, a plurality of charred barrels, each of said barrels being substantially full of whiskey to be aged, said barrels being arranged on a supporting framework in spaced relation with the head ends thereof horizontally aligned, each of said barrels having an opening in one end thereof, each of said openings in said barrels having a bung removably mounted therein, each of said bungs having a central passageway formed therethrough, each of said barrels having an inflatable bladder positioned within said barrels with the open end thereof engaging said bung in the end thereof and aligned with said opening in said bung, each of said bungs having a coupling member passing therethrough and having a flange on the inner end thereof received in the open end of said bladder, adjustable means with each of said coupling members to place and maintain said bladders in sealing engagement with said bungs, a header air line, conduits connecting said header air line with each of said coupling members to place same in fluid communication with said coupling members, means supplying air under pressure to said bladders through said header air line, said conduits and said coupling members, each of said barrels having an exhaust hole in the top thereof, each of said barrels having a plug pivotally mounted on the inside of said barrel adjacent to said exhaust hole, said plugs being covered with a soft plastic material so as to seal said exhaust holes when in contact therewith, said means being constructed and adapted so that air under pressure can be supplied to said bladders through said conduits, said couplings and said header air line to agitate said alcoholic beverage in said barrels and to place same in contact with the entire inside surfaces of said barrels, said plugs being constructed and mounted so that when air is supplied to said bladders said plugs will be forced by said beverage into sealing contact with said exhaust holes to close same and prevent said alcoholic beverage from being forced therethrough.

2. Means for aging alcoholic beverages comprising, in combination, a charred barrel, said barrel being substantially full of whiskey to be aged, said barrel having an opening in one end thereof, a bung removably mounted in said opening, said bung having a central passageway formed therethrough, an inflatable polyethylene bladder, said bladder being positioned within said barrel with the open end thereof engaging said bung and aligned with the opening therein, a coupling member passing through said bung and having a flange on the inner end thereof received in the open end of said bladder, adjustable means with said coupling to place and maintain said bladder in sealing engagement with said bung, a conduit removably secured to the outer end of said coupling to be in fluid communication with said bladder through said coupling, means supplying air under pressure to said bladder through said conduit and said coupling, an exhaust hole in the top of said barrel, check valve means mounted in said barrel and constructed to permit passage of evaporative gases from said barrel and to retain liquids in said barrel, said device being constructed and adapted so that air under pressure can be supplied to said bladder through said conduit and said coupling to agitate said alcoholic beverage within said barrel and to place same in contact with the entire inside surface of said barrel, said plug being constructed and mounted so that when air is supplied to said bladder said plug will be forced by said beverage into said exhaust hole and into sealing contact with said exhaust hole to close same and prevent said alcoholic beverage from being forced therethrough.

3. Means for aging alcoholic beverages and the like comprising, in combination, a charred barrel, said barrel being substantially full of whiskey to be aged, said barrel having a bung removably mounted in one end thereof, an inflatable bladder positioned within said barrel, a coupling member passed through said bung and having a flange on the inner end thereof received in the open end of said bladder, means maintaining said flange on said coupling member with said bladder thereon in sealing engagement with said bung, an air line connecting said coupling member to a source of air under pressure, and means supplying air under pressure to said bladder through said air line and said coupling member, and means for permitting egress of evaporative gases off said beverage during aging from said barrel without permitting said beverage therein to pass therefrom, said device being constructed and adapted so that air under pressure can be supplied to said bladder to agitate said beverage within said barrel and to place same in contact with the entire inside of said barrel.

4. Means for aging alcoholic beverages comprising, in combination, a charred barrel, said barrel containing whiskey to be aged, an inflatable polyethylene bladder positioned within said barrel, a coupling member passing into said barrel and receiving the open end of said bladder, and means supplying a fluid under pressure to said bladder through said coupling to inflate same causing said beverage within said barrel to be placed in contact with the entire inside surface of said barrel.

5. Means for aging alcoholic beverages comprising, in combination, a charred barrel, said barrel containing whiskey to be aged, an inflatable bladder received within said barrel, conduit means passing into said barrel and receiving the open end of said bladder, and means supplying a fluid under pressure to said bladder to place said beverage in contact with the entire surface of said barrel.

6. The method of aging alcoholic beverages comprising the steps of, filling a charred wooden barrel provided with an interiorly positioned inflatable bladder with whiskey to be aged, displacing the whiskey to expose same to the entire inner surface of the barrel by intermittently inflating said bladder by introducing thereinto a fluid under pressure, and simultaneously exhausting gases from said barrel.

7. The method of aging alcoholic beverages comprising the steps of, filling a charred wooden barrel provided with an interiorly positioned inflatable bladder with whiskey to be aged, agitating said whiskey by displacing same to contact the entire inner surface of the barrel by intermittently inflating said bladder, and simultaneously exhausting gases from said barrel.

References Cited in the file of this patent

UNITED STATES PATENTS

| | | |
|---|---|---|
| 2,045,859 | Klein | June 30, 1936 |
| 2,283,100 | Shores | May 12, 1942 |